United States Patent
Lindenman et al.

(10) Patent No.: US 7,121,573 B2
(45) Date of Patent: Oct. 17, 2006

(54) VEHICLE ACCESSORY MOUNTING SYSTEM

(75) Inventors: Thomas W. Lindenman, South Bend, IN (US); Richard W. McCoy, Granger, IN (US); Anthony S. Roberts, Granger, IN (US)

(73) Assignee: Cequent Towing Products, Inc., Plymouth, MI (US)

(*) Notice: Subject to any disclaimer, the term of this patent is extended or adjusted under 35 U.S.C. 154(b) by 0 days.

(21) Appl. No.: 10/917,826

(22) Filed: Aug. 13, 2004

(65) Prior Publication Data

US 2005/0146116 A1 Jul. 7, 2005

Related U.S. Application Data

(63) Continuation-in-part of application No. 10/465,773, filed on Jun. 19, 2003, which is a continuation-in-part of application No. 10/189,641, filed on Jul. 3, 2002, now abandoned.

(60) Provisional application No. 60/504,525, filed on Sep. 16, 2003, provisional application No. 60/503,227, filed on Sep. 16, 2003, provisional application No. 60/499,516, filed on Sep. 2, 2003, provisional application No. 60/497,805, filed on Aug. 26, 2003, provisional application No. 60/495,576, filed on Aug. 15, 2003.

(51) Int. Cl.
*B60J 3/00* (2006.01)
(52) U.S. Cl. .................... 280/433; 280/438.1
(58) Field of Classification Search ............. 280/433, 280/438.1, 441.1, 491.5, 495, 507, 901
See application file for complete search history.

(56) References Cited

U.S. PATENT DOCUMENTS

| | | | |
|---|---|---|---|
| 3,595,125 A | 7/1971 | Jacobs | |
| 3,941,407 A | 3/1976 | Breford | |
| 4,029,335 A | 6/1977 | Cady et al. | |
| 4,039,087 A | 8/1977 | Sandvick | |
| 4,531,774 A | 7/1985 | Whatley | |
| 4,856,804 A | 8/1989 | Nash | |
| 4,960,288 A | 10/1990 | Chambers | |
| 5,044,651 A | 9/1991 | Weikel | |
| 5,141,277 A | 8/1992 | Alexander | |
| 5,306,037 A | 4/1994 | Robertson | |
| D362,224 S | 9/1995 | McCoy et al. | |
| 5,449,191 A | 9/1995 | Cattau | |
| 5,509,682 A | 4/1996 | Lindenman et al. | |
| 5,516,137 A | 5/1996 | Kass et al. | |
| 5,529,329 A | 6/1996 | McCoy | |

(Continued)

*Primary Examiner*—Tony Winner
(74) *Attorney, Agent, or Firm*—McDonald Hopkins Co., LPA; Robert H. Earp, III; David J. Smith

(57) ABSTRACT

Vehicle accessory mounting systems are limited in the accessories mountable thereto and interfere with the use of the bed. The present invention, however, is a vehicle accessory mounting system that comprises a frame assembly having an opening and a locking cavity being in communication with the opening, and at least one accessory mounting member capable of being removably mounted within the opening to removably mount an accessory to a vehicle. The accessory mounting member comprises a body, a locking element aperture within the body, and a locking element held within the aperture, the locking element being moveable between a retracted, unlocked position wherein the locking element does not engage the locking cavity and an extended, unlocked position wherein the locking element engages the locking cavity to prevent removal of the mounting member from within the opening.

20 Claims, 18 Drawing Sheets

U.S. PATENT DOCUMENTS

| | | |
|---|---|---|
| D376,751 S | 12/1996 | Hanson et al. |
| 5,580,073 A | 12/1996 | Irwin et al. |
| D378,077 S | 2/1997 | Lindenman et al. |
| 5,707,070 A | 1/1998 | Lindenman et al. |
| 5,738,471 A | 4/1998 | Zentner et al. |
| 5,772,229 A | 6/1998 | Cattau |
| 5,839,745 A | 11/1998 | Cattau et al. |
| 5,937,679 A * | 8/1999 | Villalon, Jr. ................ 280/507 |
| 5,971,418 A | 10/1999 | Lindenman et al. |
| 6,065,766 A | 5/2000 | Pulliam |
| 6,193,261 B1 * | 2/2001 | Hahka ........................ 280/507 |
| 6,467,791 B1 | 10/2002 | Fandrich et al. |
| 6,502,846 B1 | 1/2003 | Fandrich et al. |
| 6,533,308 B1 | 3/2003 | Tambornino |
| 6,543,260 B1 * | 4/2003 | Koy et al. .................. 280/507 |
| 2003/0015855 A1 | 1/2003 | McCoy et al. |
| 2003/0034633 A1 * | 2/2003 | Belinky ...................... 280/507 |
| 2003/0038452 A1 | 2/2003 | Lindenman et al. |
| 2003/0209878 A1 | 11/2003 | Lindenman et al. |
| 2003/0209879 A1 | 11/2003 | Lindenman et al. |

* cited by examiner

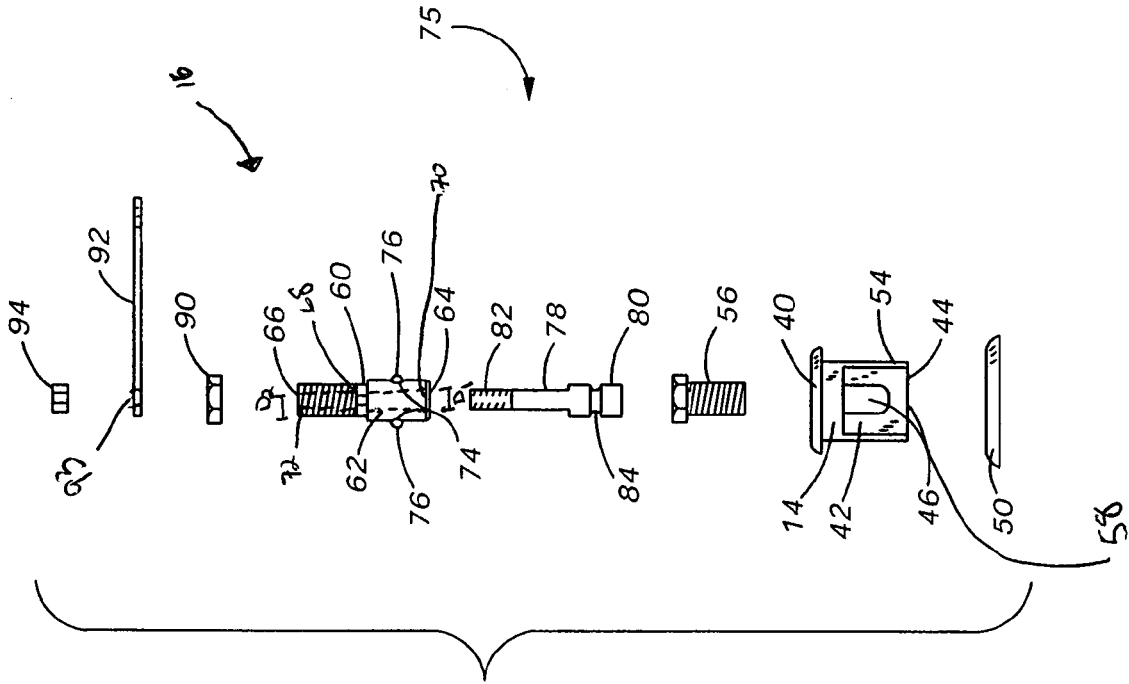
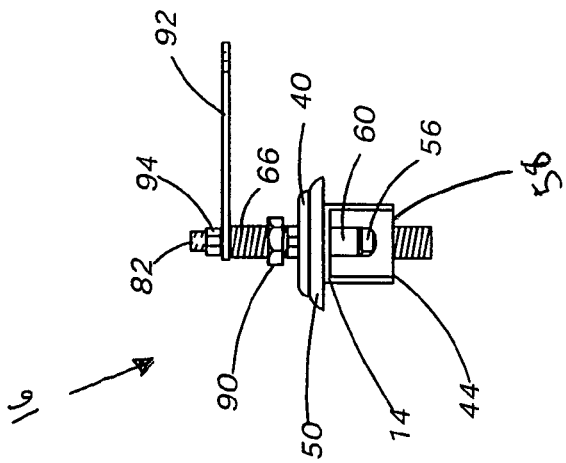
FIG. 3

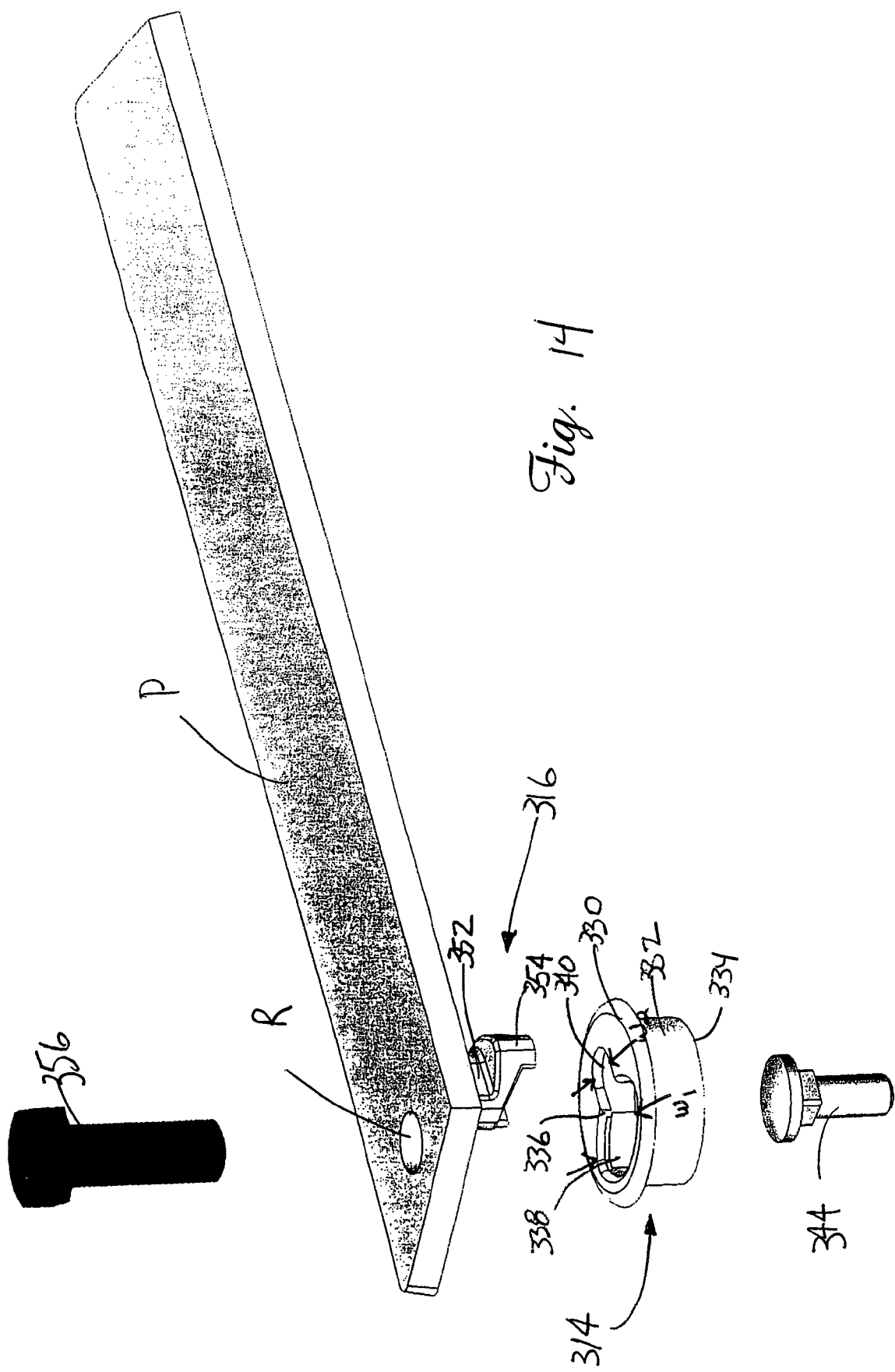

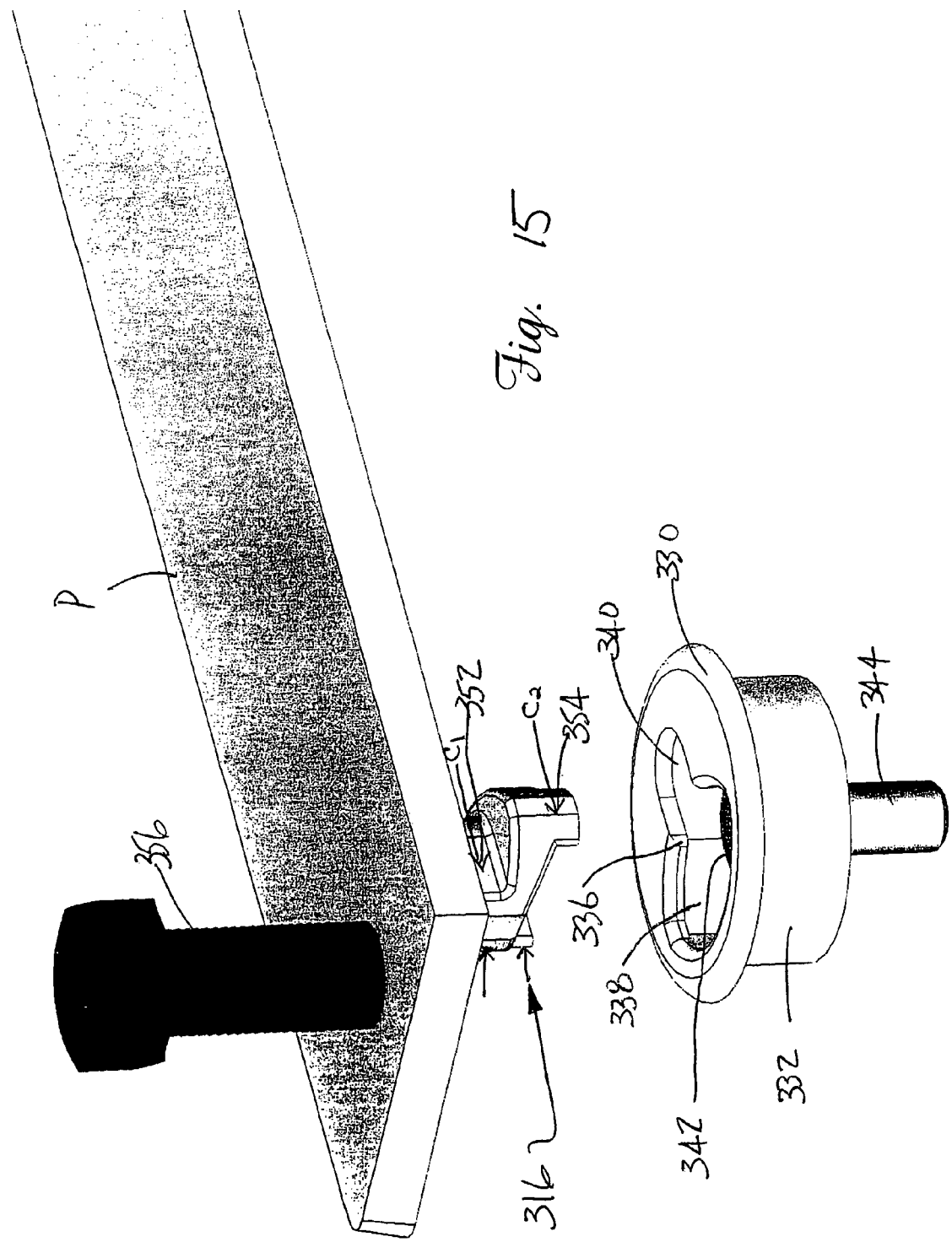

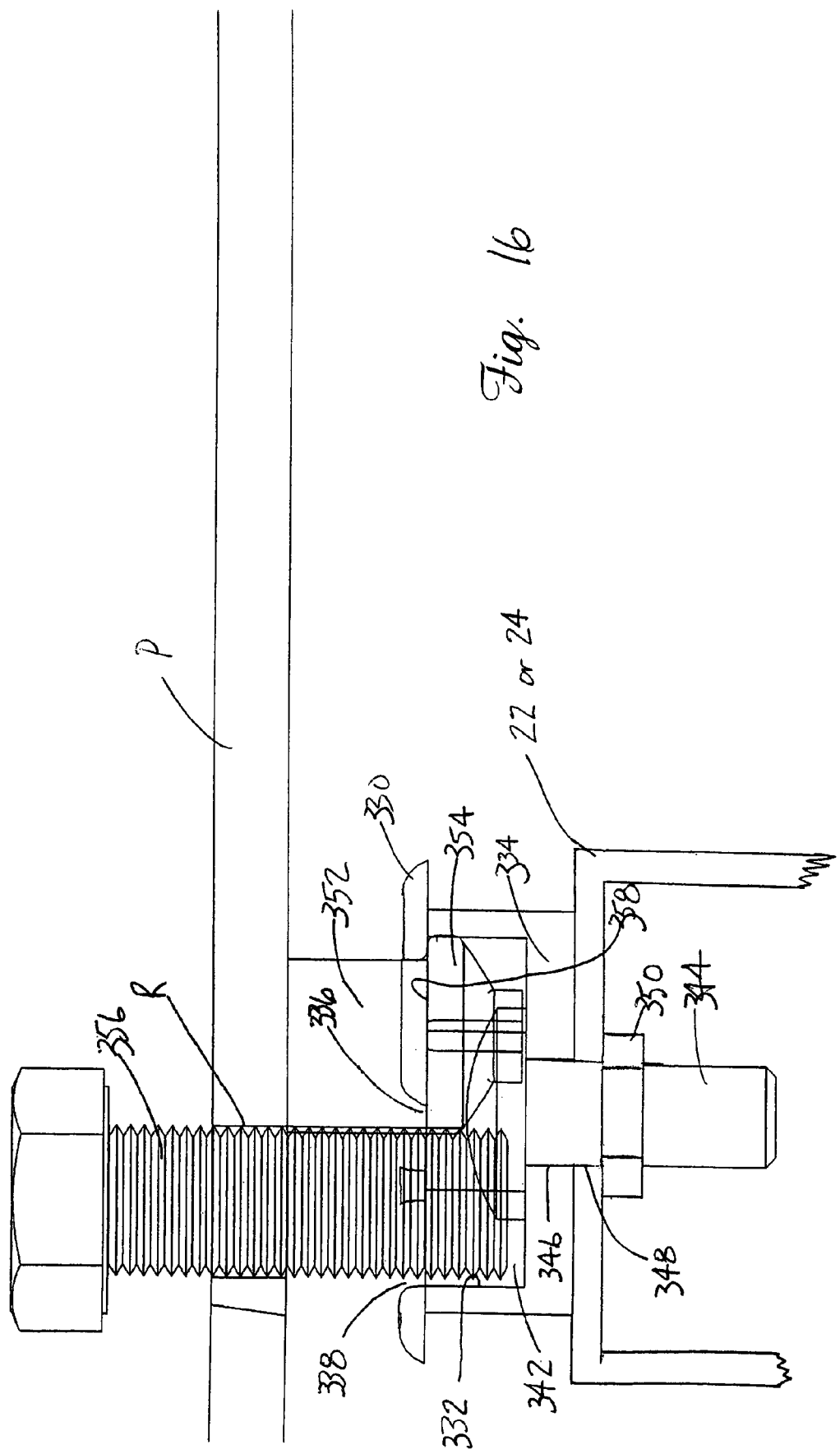

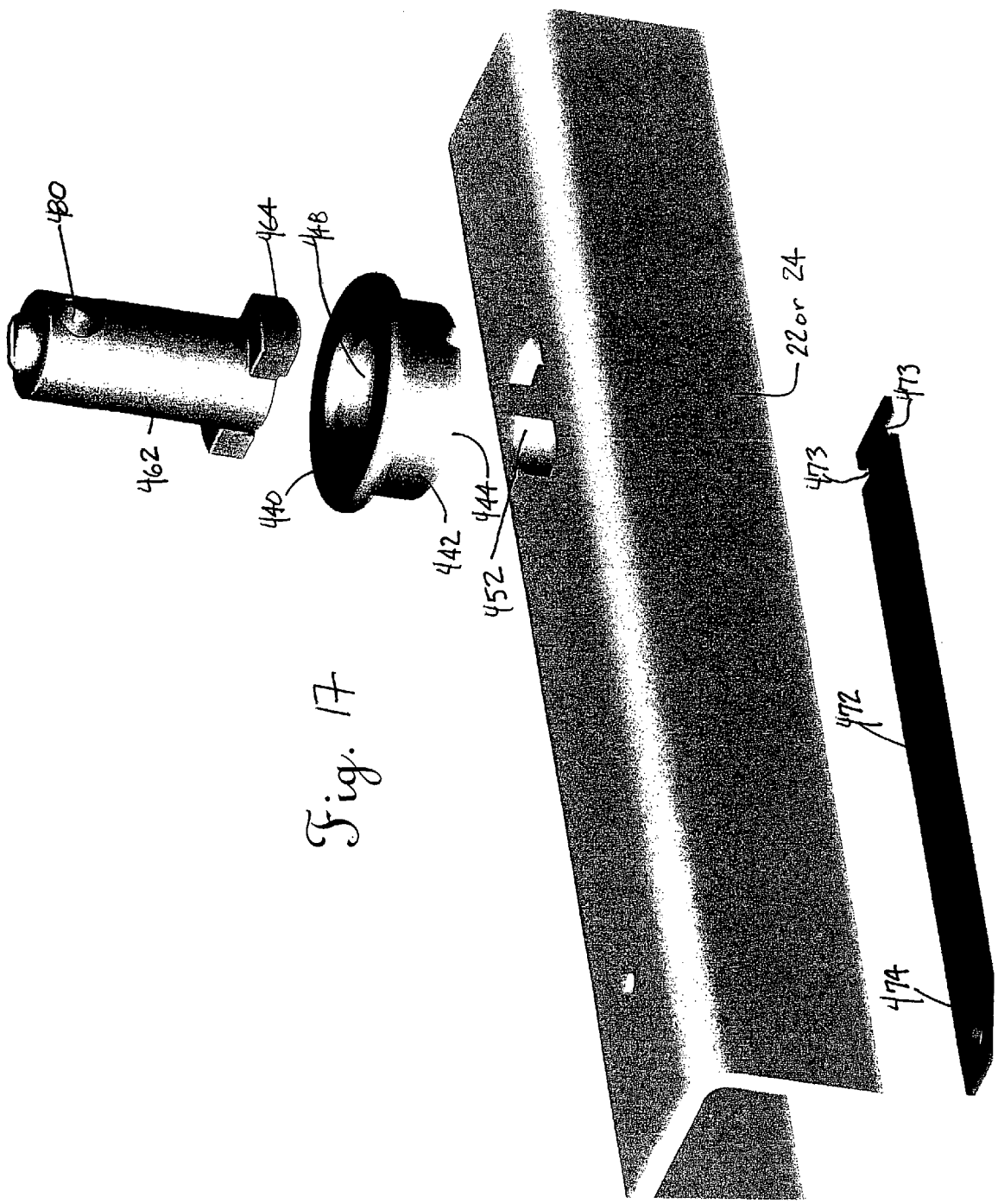

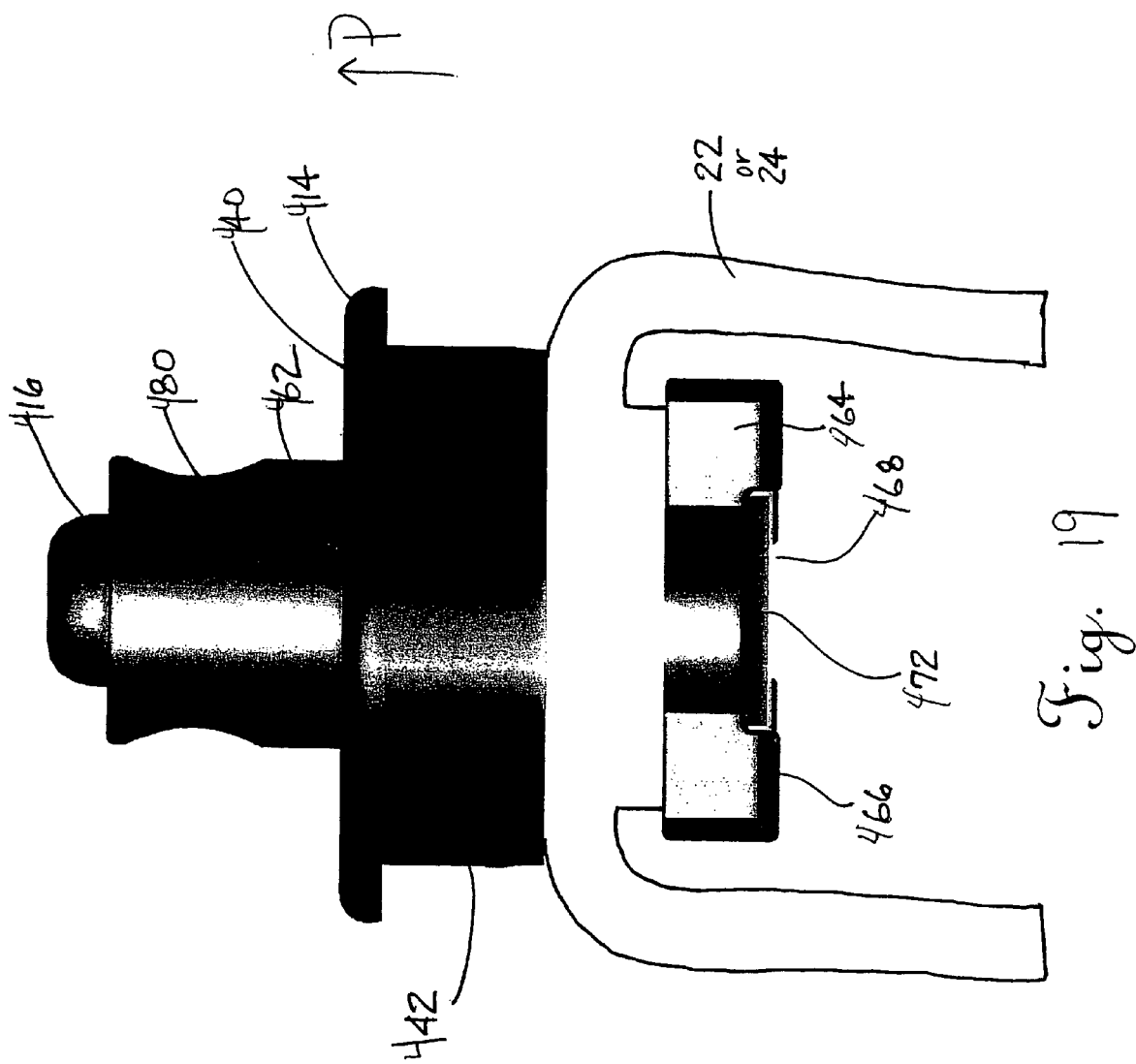

VEHICLE ACCESSORY MOUNTING SYSTEM

CROSS-REFERENCE TO RELATED APPLICATIONS

This application claims priority from U.S. Provisional Patent Application No. 60/495,576 filed on Aug. 15, 2003, U.S. Provisional Patent Application No. 60/497,805 filed on Aug. 26, 2003, U.S. Provisional Patent Application No. 60/499,516 filed on Sep. 2, 2003, U.S. Provisional Patent Application No. 60/503,227 filed on Sep. 16, 2003, U.S. Provisional Patent Application No. 60/504,525 filed on Sep. 16, 2003, and a continuation-in-part of U.S. Utility patent application Ser. No. 10/465,773 filed on Jun. 19, 2003, which is a continuation-in-part of U.S. Utility patent application Ser. No. 10/189,641 filed on Jul. 3, 2002 now abandoned, wherein each of these applications are expressly incorporated by reference herein.

TECHNICAL FIELD

The present invention relates generally to the towing equipment field and, more particularly, to a system for mounting an accessory to a vehicle.

BACKGROUND

Over the years, various towing systems have been developed for mounting in the bed or cargo area of pickup trucks and related vehicles. U.S. Pat. Nos. 5,509,682 and 5,707,070 both to Lindenman et al. are representative of fifth wheel hitch assemblies and U.S. Pat. No. 5,971,418 to Lindenman et al. and Des. 362,224 to McCoy et al. are representative of gooseneck hitch assemblies useful for this purpose. Such hitch assemblies are typically securely mounted through the cargo bed to the frame of the vehicle by means of a mounting system. Some mounting systems such as disclosed in U.S. Pat. No. 5,509,682 incorporate base rails or other structures that mount above the cargo bed. Others, such as illustrated in U.S. Pat. No. 5,971,418 incorporate a structural framework that mounts underneath the bed of the vehicle.

The present invention relates to an under bed mounting system of relatively simple construction. It is user friendly and provides reliable and dependable performance over a long service life. The mounting system also offers the consumer unparalleled versatility since one may mount a number of different vehicle accessories to the vehicle through the mounting system. Such accessories include but are not limited to a fifth wheel hitch assembly, a gooseneck hitch assembly and an article anchor or carrier such as a bike rack, a motorcycle stand or other useful device. Consequently, the mounting system represents a significant advance in the art.

SUMMARY OF THE INVENTION

In accordance with the purposes of the present invention as described herein, a vehicle accessory mounting system is provided. That vehicle accessory mounting system comprises a frame assembly having an opening and a locking cavity being in communication with the opening, at least one accessory mounting member capable of being removably mounted within the opening to removably mount an accessory to a vehicle. The accessory mounting member comprises a body, a locking element aperture within the body, and a locking element held within the aperture, the locking element being moveable between a retracted, unlocked position wherein the locking element does not engage the locking cavity and an extended, unlocked position wherein the locking element engages the locking cavity to prevent removal of the mounting member from within the opening.

In accordance with an alternative of the present invention, a vehicle accessory mounting system for use with a vehicle having a horizontal mounting surface is disclosed. The vehicle accessory mounting system comprises a frame member mounted to the frame of a vehicle underneath the horizontal mounting surface, a receptacle carried by the frame member, the receptacle having an opening and a locking cavity, the locking cavity being in communication with the opening, the receptacle opening accessible through an aperture in the horizontal mounting surface, and an accessory mounting member capable of being removably mounted within the opening so as to removably mount an accessory to the horizontal mounting surface. Further, the at least one accessory mounting member comprises, a body having a sidewall, an aperture extending through the sidewall, and a locking element held within the sidewall aperture, the locking element being moveable between a retracted, unlocked position wherein the locking element does not engage the locking cavity and an extended, locked position wherein the locking element engages the locking cavity to prevent removal of the mounting member from within the opening.

In the following description there is shown and described several embodiments of this invention, including an illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serve to explain certain principles of the invention. In the drawings:

FIG. 3 is an exploded perspective view of an accessory mounting member of the mounting system shown in FIG. 1;

FIG. 14 is an exploded, detailed perspective view of another alternate embodiment illustrating the connection of the locking element and member to the base plate of the accessory as well as the receiver and the bolt for securing the receiver to the frame;

FIG. 15 is a detailed perspective view of the alternate embodiment illustrating the positioning of the locking element and the alignment of the member over the wide end of the keyhole slot in the receiver just prior to connection of the member to the receiver;

FIG. 16 is a schematic cross-sectional view of the components of the alternate embodiment shown in FIG. 15.

FIG. 17 is a detailed, exploded perspective view of another alternate embodiment showing the member mechanism;

FIG. 19 is an end view of the alternate embodiment showing a single member locked in the storage position.

Reference will now be made in detail to the present preferred embodiment of the invention, an example of which is illustrated in the accompanying drawings.

DETAILED DESCRIPTION

Figure 1:
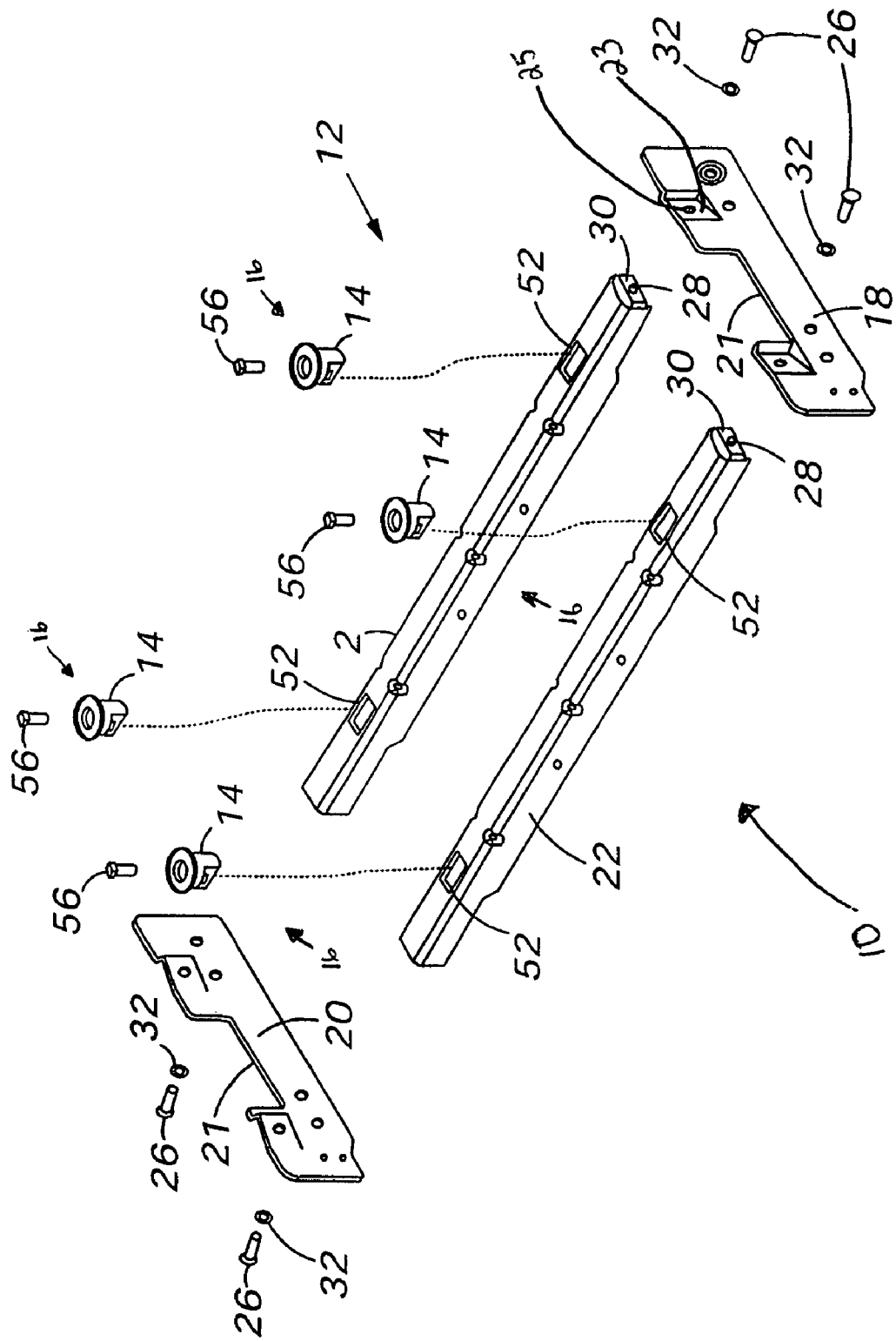
FIG. 1 is an exploded perspective view of the vehicle accessory mounting system of the present invention.
Figure 2A:
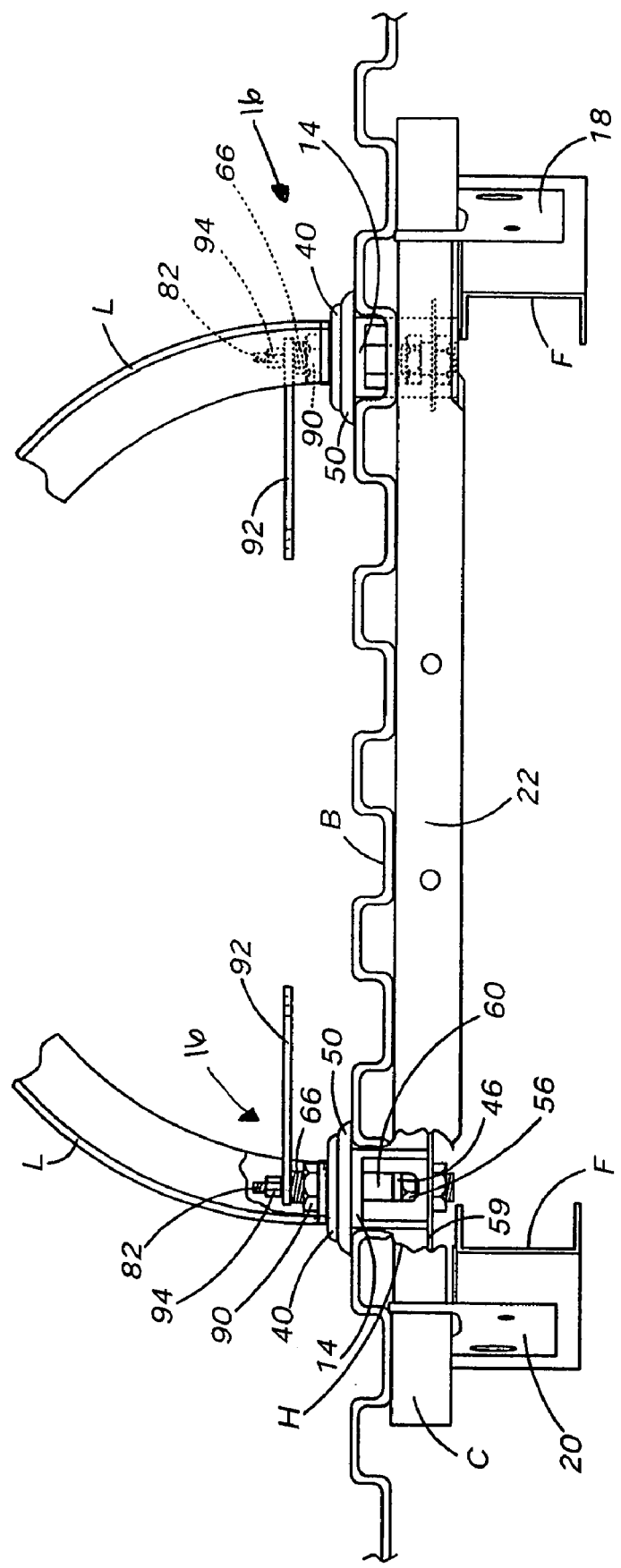
FIG. 2A is a schematic of a rear elevational view showing the under bed mounting of the vehicle accessory mounting system to the frame of a vehicle.
Figure 2B:
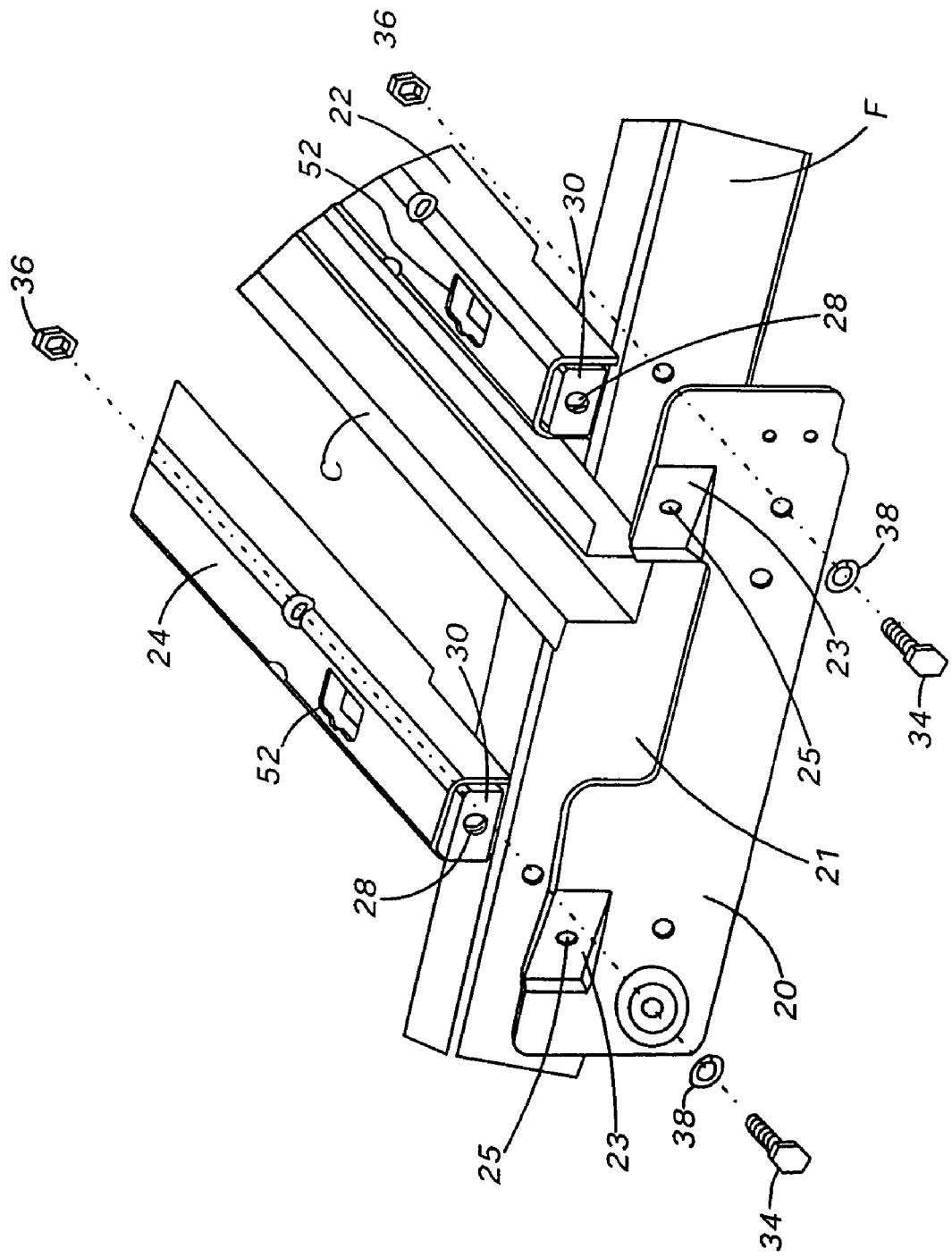
FIG. 2B is a perspective view showing the mounting of the mounting system frame to the vehicle frame.

Reference is now made to FIGS. 1 and 2 illustrating the preferred embodiment of the vehicle accessory mounting system 10. The vehicle accessory mounting system 10 includes a frame assembly 12, at least one receptacle 14 carried by the frame assembly 12, and at least one accessory mounting member 16.

As best illustrated in FIGS. 1 and 2, the frame assembly 12 includes a first mounting bracket 18 and a second mounting bracket 20. The two mounting brackets 18, 20 are constructed from high strength material such as steel. They also may incorporate various notches and cutouts 21 to accommodate any vehicle channels C while allowing them to seat against the framework F of the vehicle to which the mounting system 10 is to be secured. First and second cross members 22, 24 extend between the first and second mounting brackets 18, 20. The cross members 22, 24 are also formed from high strength material such as tubular steel. The cross members 22, 24 are of a length sufficient to just span the distance between the first and second mounting brackets 18, 20 when those brackets engage the vehicle framework F. Alternatively, the cross members 22, 24 may be made from two telescoping U-shaped or even tubular sections if desired to allow for adjustability.

The cross members 22, 24 may be secured to the first and second mounting brackets 18, 20 at offsets 23 by fasteners such as bolts 26. More specifically, the bolts 26 pass through an aperture 25 in each offset 23 and threadedly engage an aperture 28 formed in an end plate 30 in each cross member 22, 24. A lock washer 32 under the head of the bolt 26 ensures the integrity of each connection. Of course, alternative means of connection could be utilized including other types of fasteners (e.g., screws, cooperating nuts and bolts) or alternative mechanical fastening processes such as welding.

The first and second mounting brackets 18, 20 mount to the vehicle framework F by any appropriate means. This includes bolts 34, cooperating nuts 36, and lock washers 38 as illustrated. Alternatively, other appropriate fasteners (e.g., screws) or mechanical fastening processes such as welding could be utilized.

Figure 4:
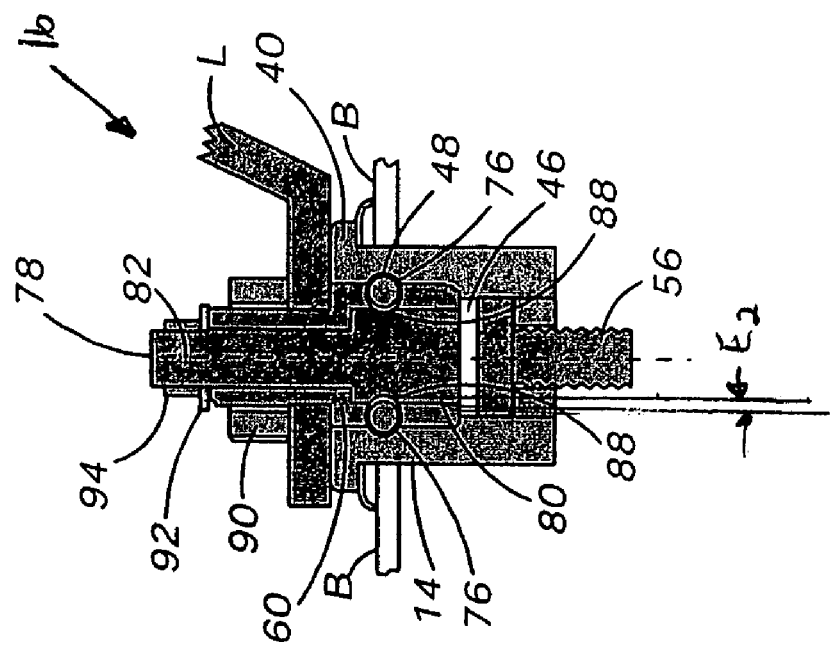
FIG. 4 is an elevational and partially cross-sectional view showing an accessory mounting member in a receptacle with the locking element in the unlocked position.
Figure 5:
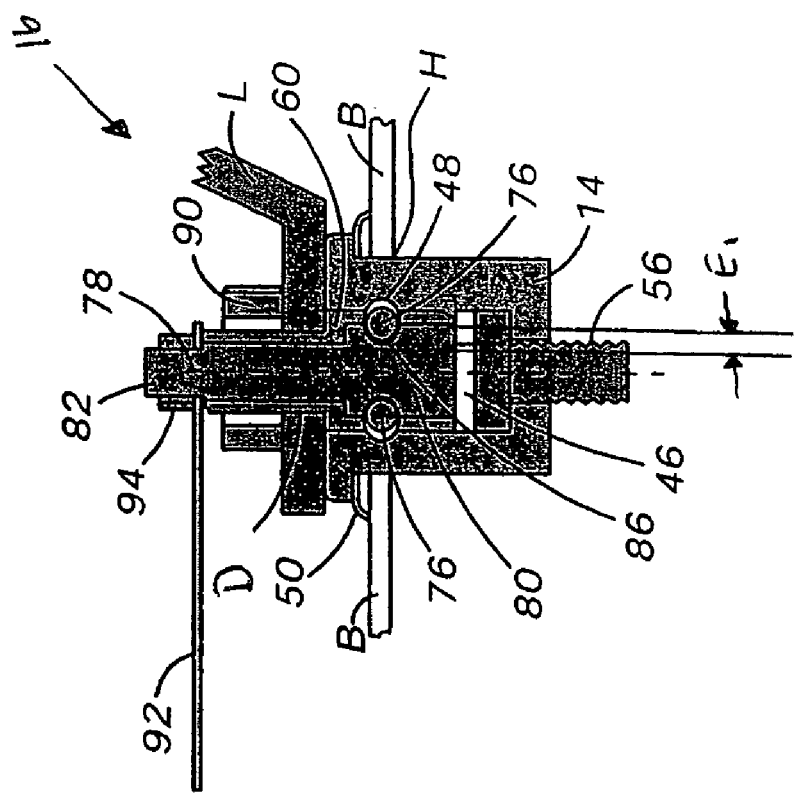
FIG. 5 is a view similar to FIG. 4 but showing the locking element in the locked position.

Each receptacle 14 of the present invention includes an upper rim 40, a sidewall 42 and a bottom wall 44. An opening or bore 46 extends through the upper rim 40 and the sidewall 42. As depicted in FIGS. 4 and 5, a locking cavity such as a detent or continuous race 48 is formed in the inner surface of the sidewall 42 in communication with the opening 46. A decorative ring 50 fits around the sidewall 42 directly beneath the upper rim 40.

Each receptacle 14 is mounted in a socket 52 provided in either the first cross member 22 or the second cross member 24 or both. More specifically, socket 52 is elongated and sized and shaped so as to receive a lower sidewall 54 of the receptacle 14. When the frame assembly 12 is properly mounted to the framework F of the vehicle, the cross members 22, 24 are located directly beneath the bed B of the vehicle (see FIG. 2A). A hole H is cut in the bed B directly above the socket 52 and the lower portion of the receptacle 14 is inserted into the socket 52 through the hole H. When properly seated in the socket 52, the decorative ring 50 extends between the upper surface of the bed B and the lower edge of the upper rim 40 so as to enhance the aesthetic appeal of the receptacle 14 and keep dirt out of the hole H. The receptacle 14 is secured in the socket 52 by means of an anchor 56. The anchor 56 is illustrated as a bolt that passes through a mounting hole or mounting aperture 58 in the bottom wall 44 of the receptacle 14 and threadedly engages an aperture (not shown) in a wall or plate 59 of the underlying cross member 22, 24. Alternatively, the bolt 56 could pass through an aperture in the bottom wall of the cross member 22, 24 and be secured in place by a cooperating nut and lock washer (not shown) if desired.

As depicted in FIG. 3, the accessory mounting member 16 of the present invention includes a body 60 including a sidewall 62, a first end 64, a second end 66, and a bore 68. The bore 68 includes a first section 70 having a first diameter $D_1$ (about 0.8125 inches) adjacent the first end 64 and a second section 72 having a second diameter $D_2$ (about 0.5 inches) adjacent the second end 66 wherein $D_1 > D_2$. Two radially directed locking apertures 74 are provided in the sidewall 62 and are in communication with the first section 70 of the bore 68.

The present invention further includes a rotary locking assembly 75. The rotary locking assembly 75 secures a vehicle accessory A to the vehicle accessory mounting system 10. The rotary locking assembly 75 includes a locking element 76, which may take the form of a ball bearing. The locking element 76 may be staked in each locking aperture 74. In addition, the rotary locking assembly 75 includes a rotary actuator 78 that engages the locking elements 76. The actuator 78 includes a head end 80 and stem end 82. A channel 84 is provided in the head end 80. The channel 84 includes a first portion 86 having a depth $E_1$ and a second portion 88 having a depth $E_2$ where $E_1>E_2$. The channel 84 may also extend continuously around the head end 80.

When the actuator 78 is properly seated in the bore 68 of the body 60, the channel 84 is aligned with the locking apertures 74 with the locking elements 76 engaged in the channel. Further, the stem end 82 projects from the second end 66 of the body 60. The stem end 82 is at least partially threaded and takes the form of a "mutilated screw."

The mounting member 16 is secured to the leg L or other structure of the vehicle accessory A. More specifically, the second end 66 of the body 60 is threaded. That second end 66 is inserted in an aperture D in the leg L and a fastener such as a nut 90 is tightened on the threaded second end 66 so that the margin of the leg L surrounding the aperture D is captured between the nut 90 and an operator handle 92 at the intersection of the first and second ends 64, 66 of the body 60.

The operator handle 92 is secured to the stem end 82 of the actuator 78. More specifically, the operator handle 92 includes an eccentric aperture 93 that is sized and shaped to just fit over the stem end 82. A nut 94 is secured to the threaded stem end 82 and tightened to secure the operator handle 92 in position. As should be appreciated, the operator handle 92 may be manipulated so as to rotate the actuator 78 in the body 60 and thereby displace the locking elements 76 between the unlocked position shown in FIG. 4 and the locked position shown in FIG. 5.

More specifically, when in the unlocked position shown in FIG. 4, the first portion 86 of the channel 84 engages the locking elements 76. That first channel portion 86 has sufficient depth to provide the clearance necessary to allow the locking elements 76 to retract inside the body 60. Accordingly, the locking elements 76 do not project beyond the sidewall 62 of the body 60. In this position the member 16 freely passes into the opening 46 of the receptacle 14. When the member 16 is fully seated within the receptacle 14, the locking elements 76 are aligned with the race 48 in the sidewall 42 of the receptacle 14. The member 16 may now be locked into the receptacle 14 by rotating the operator handle 92 through an arc of approximately 90 degrees in either direction. As this is done the second portion 88 of the channel 84 is brought into engagement with the locking elements 76. The second portion 88 of the channel 84 is not as deep as the first portion 86. As a result the locking elements 76 are forced in an outward direction until they project beyond the sidewall 62 of the body 60 and are at least partially received in the race 48 of the receptacle 14. Of course, the engagement of the locking elements 76 in the race 48 ensures that the member 16 is secured in the receptacle 14 and cannot be withdrawn. It should be appreciated that the operator handle 92 may be secured in the locked position by pinning or locking to a locking bracket or other structure (not shown) carried on the leg L or other structure of the vehicle accessory.

When it is desired to remove the vehicle accessory, the operator handle 92 is released and then rotated through a 90-degree arc until the first portion 86 of the channel 84 is again aligned with each locking element 76. In this position, an upward force applied to the member 16 causes the locking elements 76 to retract from the race 48 into the sidewall 62 of the body 60. This provides the necessary clearance for the member 16 to be removed from the receptacle 14.

In a first alternative embodiment, each receptacle 114 includes an upper rim 140, a sidewall 142 a bottom wall 144 and a threaded opening or bore 146 that extends through the upper rim 140 and is closed at the opposite end by bottom wall 144. A decorative ring 150 fits around the sidewall 142 directly beneath the upper rim 140. Each receptacle 114 is mounted in the same manner as the previous embodiment disclosed above.

Figure 6:
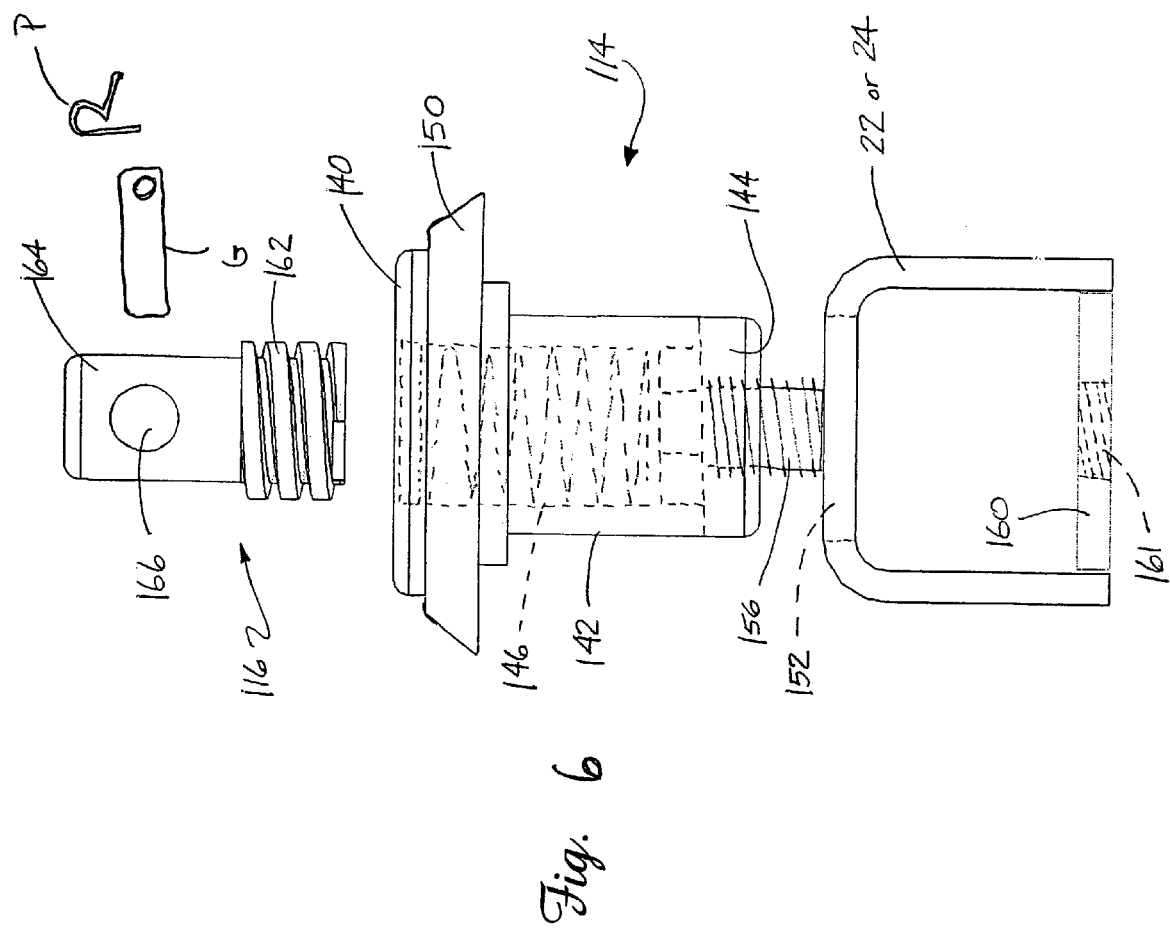
FIG. 6 is a detailed perspective view of an alternate embodiment illustrating the structural relationship between the cross member of the frame, the receptacle and the member (the decorative ring is removed for clarity)
Figure 7:
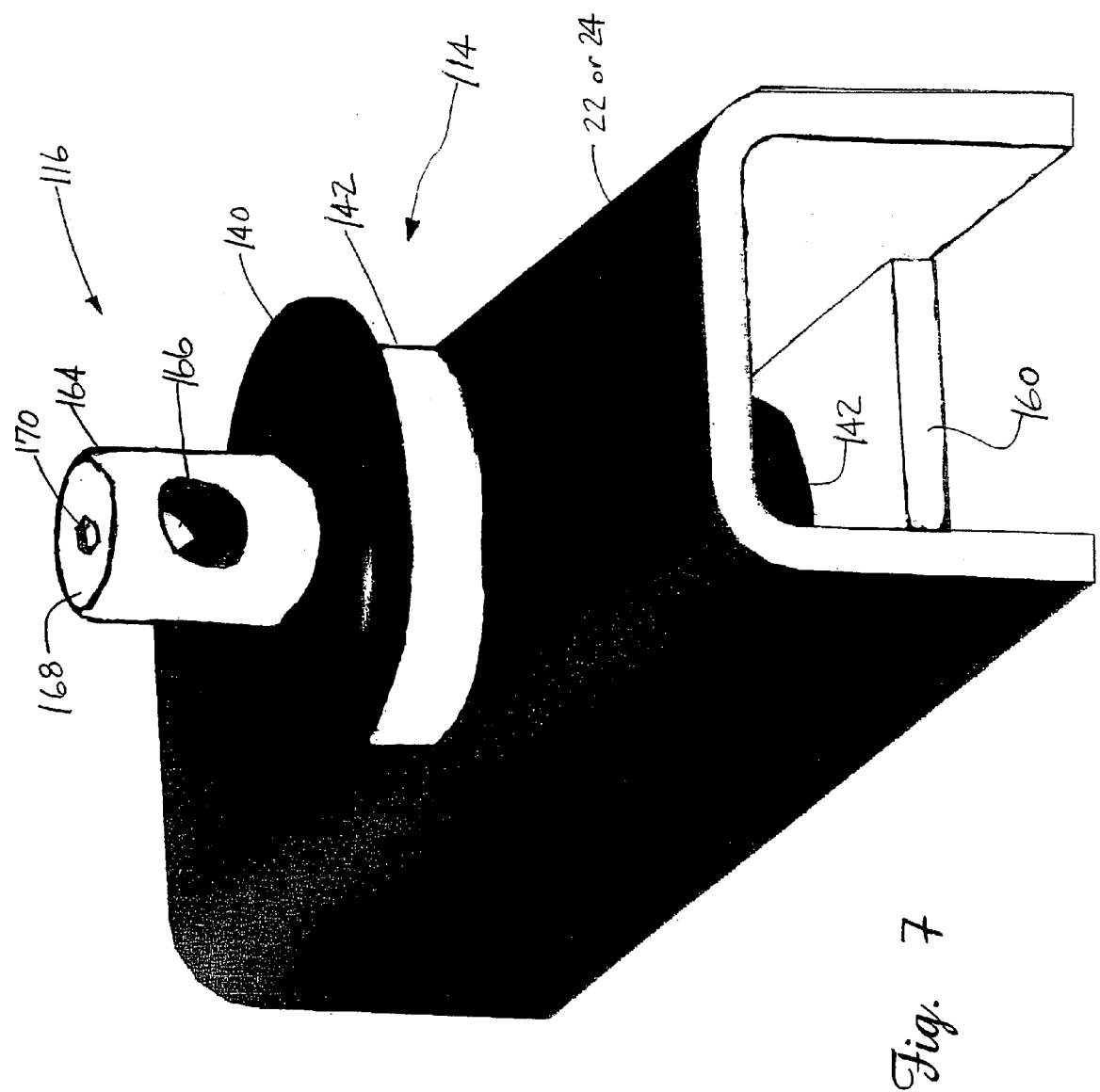
FIG. 7 is a partially exploded side elevational view of the alternate embodiment illustrating the mounting of the member in the receptacle and the receptacle in frame.
Figure 8:
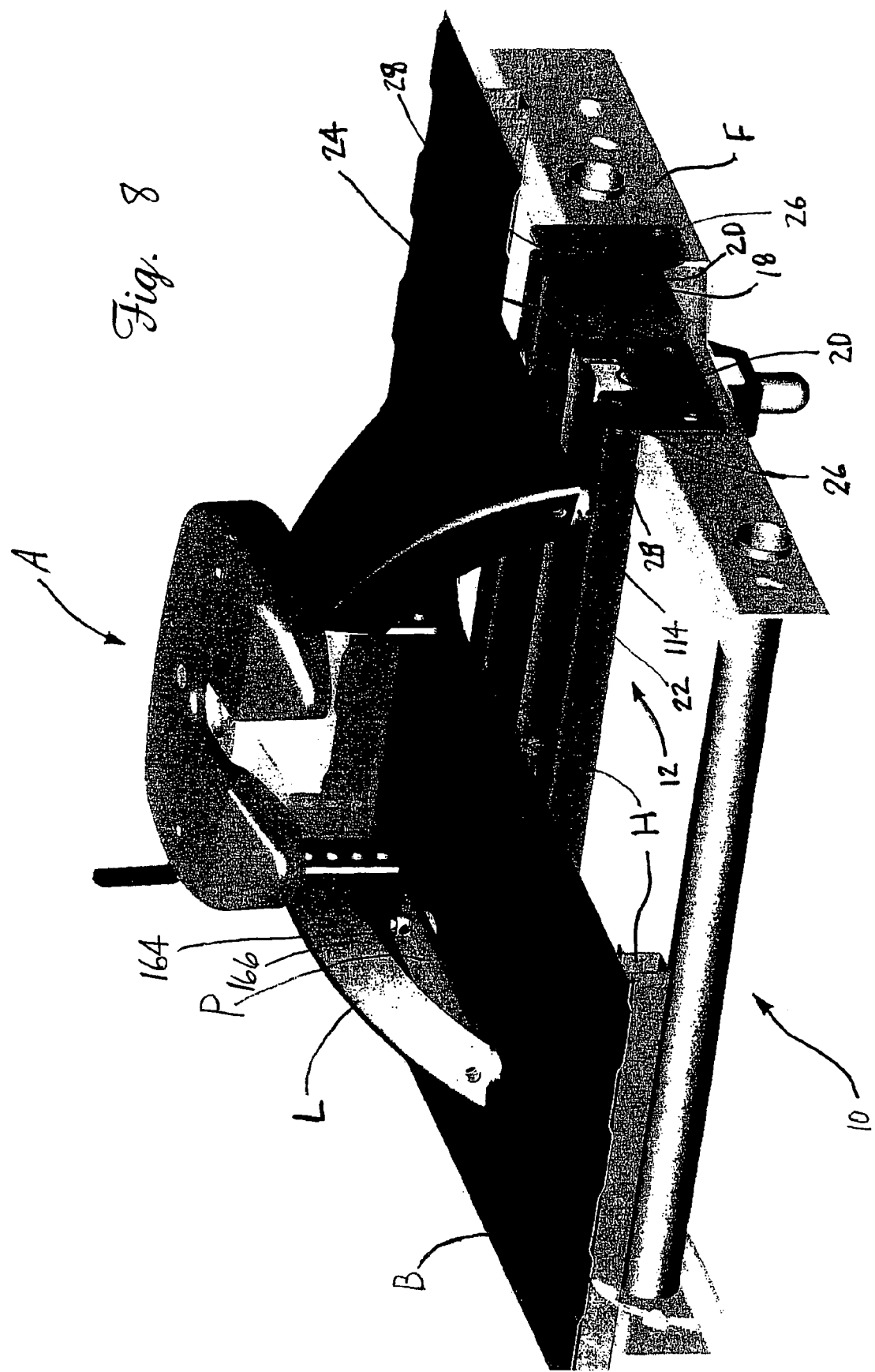
FIG. 8 is a partially cutaway perspective view showing the accessory mounting system of the alternate embodiment on the deck or bed of the vehicle and attached to the frame.

The accessory mounting member 116 of the first alternative embodiment is shown in FIGS. 6–8. Each member 116 includes a threaded body portion 162 and a projecting receiver 164. The receiver 164 includes an aperture 166 that extends completely through the receiver. An end 168 of the receiver 164 includes a recess 170 to receive a tool for displacing the accessory mounting member 116 between storage and accessory receiving positions. Thus, for example, the recess 170 may be hexagonal in shape to receive a cooperating tool in the form of a hex key.

The accessory mounting member 116 is received in the receptacle 114 by engaging the threaded body portion 162 with the threaded bore 146. More specifically, the threaded body portion 162 may be rotated using a tool engaged in the recess 170. Turning in a clockwise direction serves to displace the mounting member 116 downwardly into the receptacle 114 to the storage position. In contrast, turning the mounting member 116 counterclockwise tends to raise or extend the member from the receptacle 114 thereby displacing the member 116 into the accessory receiving position.

As shown in FIG. 8, when it is desired to attach an accessory A each member 116 is displaced into the accessory receiving position. Thus, a tool is utilized to rotate the member 116 counterclockwise until the receiver 164 and more particularly, the aperture 166 just projects above the top of the rim 140. Each leg L of the accessory A includes a base plate P having an aperture that is received over the member 116. A fastener G, such as a pin, is then inserted through the aperture 166 and pin clip P is then inserted on the end of the fastener G to complete the secure connection. Specifically, it should be appreciated that the fastener G is securely held in the aperture 166 of the receiver 164 by the capturing of the receiver 164 between the head of the pin and the clip P. Further, the accessory A is securely held in a bed B, or horizontal mounting surface, of the towing vehicle since the base plate P of the accessory is captured between the fastener G and the bed B.

Figure 10:
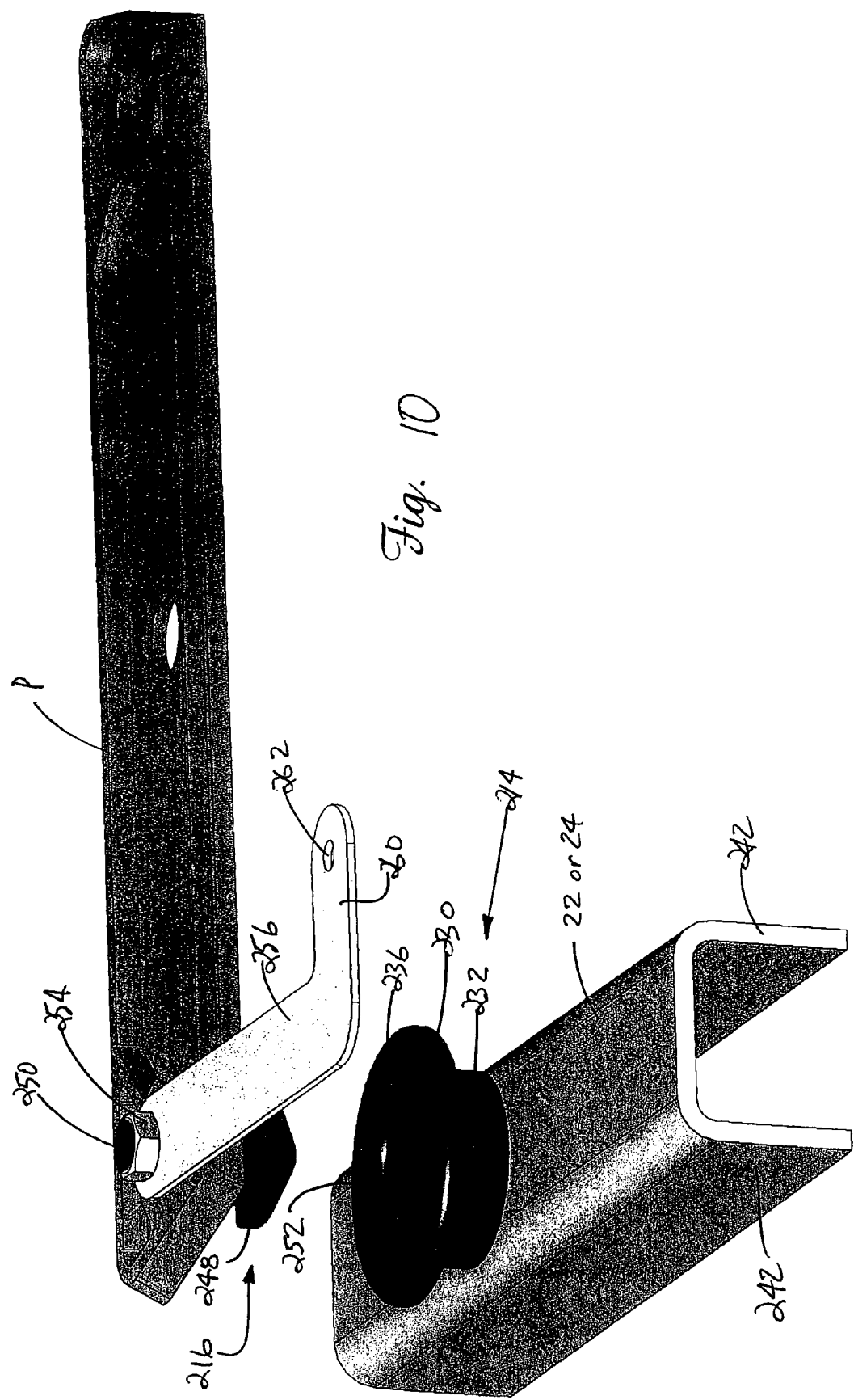
FIG. 10 is an additional detailed view of the alternate embodiment showing the alignment of the receptacle and accessory mounting member for purposes of interconnection.
Figure 11:
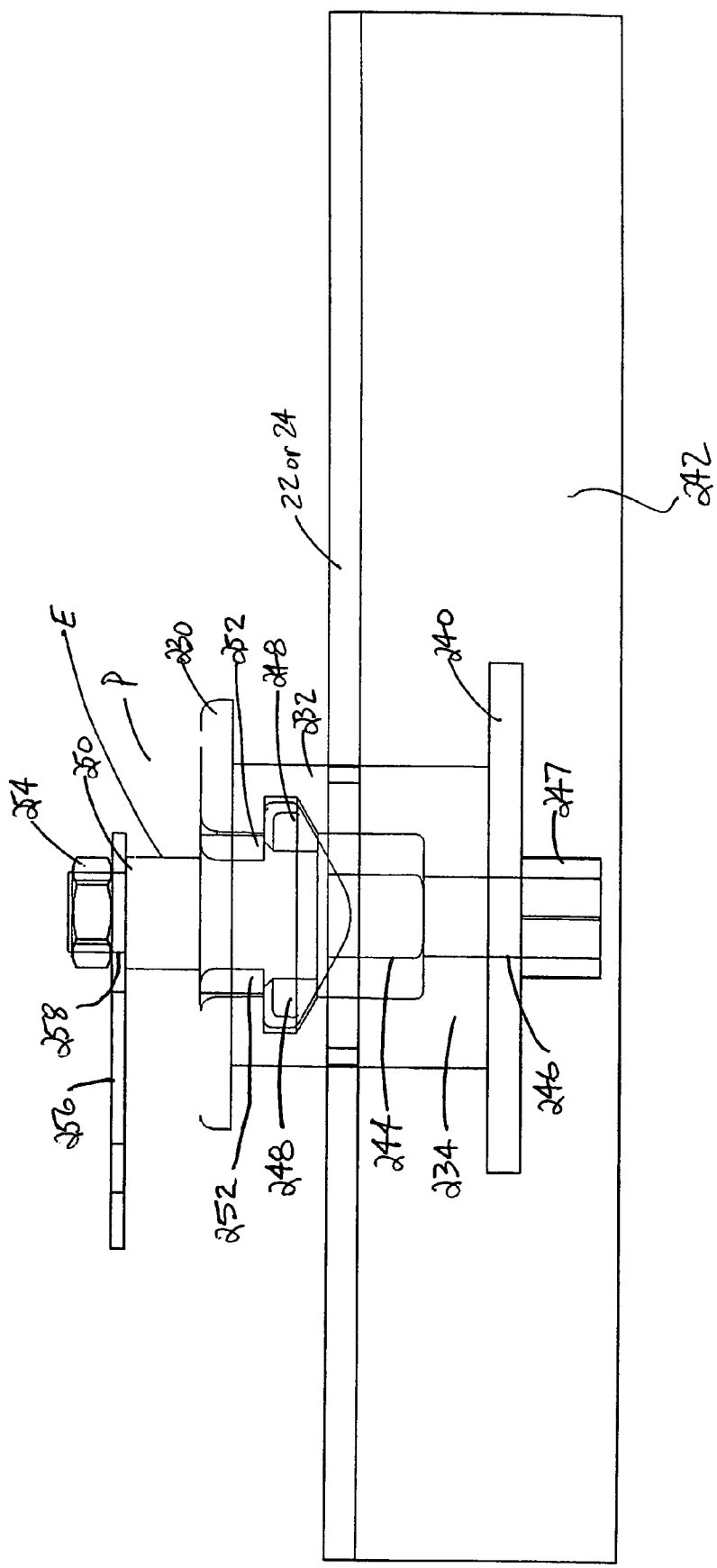
FIG. 11 is a detailed cross-sectional view of the alternate embodiment illustrating the accessory mounting member locked in the receptacle.
Figure 12:
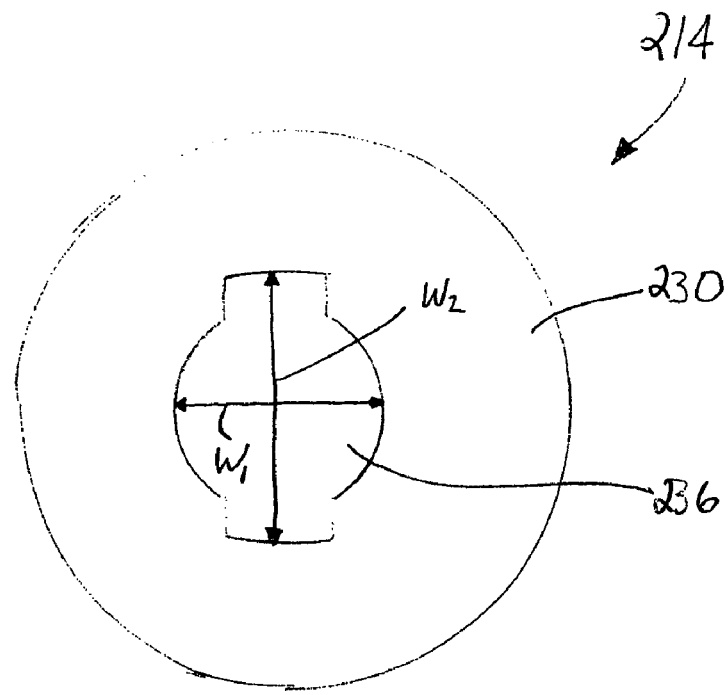
FIG. 12 is a schematic plan view of the locking cavity of the alternate embodiment.

In a second alternative embodiment of the present invention depicted in FIGS. 9–13, each receptacle 214 includes a projecting rim or upper wall 230, a sidewall 232 and a bottom wall 234. A locking cavity 236 is acircular in cross section and, as depicted in FIG. 12, has a first width $W_1$ in a first direction and a second width $W_2$ in a second direction wherein $W_2>W_1$. The locking cavity 236 extends through the rim or top wall 230 but the bottom wall 234 closes the cavity 236.

Each receptacle 214 is mounted to at least one of the cross members 22, 24 by a receiver 238, in the form of an aperture sized and shaped to receive the sidewall 232 of the receptacle 214. The receiver 238 is provided in the upper wall of at least one of the cross members 22, 24. When the receptacle 214 is fully seated in the receiver 238, the bottom wall 234 engages an underlying support plate 240 welded to the sidewalls 242 of the cross members 22, 24. A fastener 244, such as the illustrated bolt, passes through an aperture in the bottom wall 234 of the receptacle 214 and an aligned aperture 246 in the support plate 240. A nut 247 is received on the end of the bolt 244 and tightened in order to secure the receptacle 214 in the receiver 238 on the cross members 22, 24.

Figure 9:
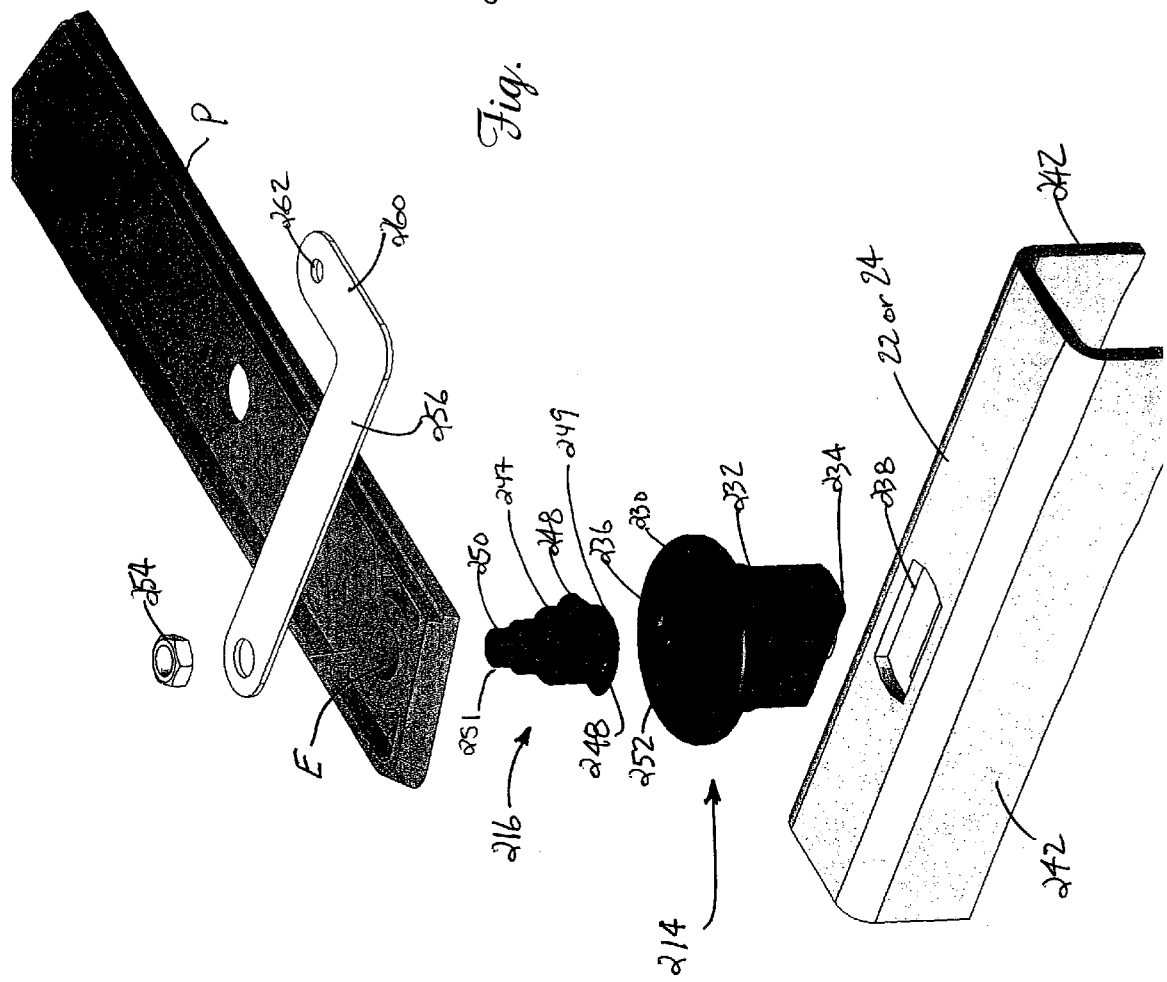
FIG. 9 is a detailed, exploded perspective view of another alternate embodiment of the vehicle accessory mounting system of the present invention.
Figure 13:
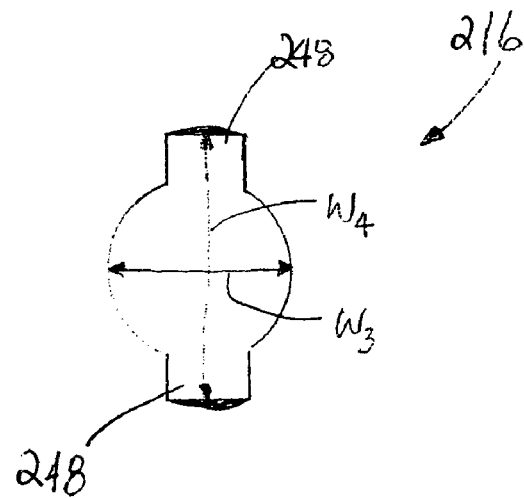
FIG. 13 is a schematic plan view of the mounting member of the alternate embodiment.

The accessory mounting member 216 is best illustrated in FIGS. 9, 10 and 11. Each member 216 includes a body 247 having at least one locking lug 248 adjacent a first end 249 thereof and an accessory mounting shank 250 adjacent a second end 251 thereof. As shown, the member 216 includes two opposed locking lugs 248. Further, as shown in FIG. 13, the mounting member 216 has a width $W_3$ along a first axis and a width $W_4$ along a second axis wherein $W_2 > W_4 > W_1 > W_3$. Thus, it should be appreciated that when the second axis of the mounting member 216 is aligned with the second direction of the locking cavity 236, sufficient clearance exists for the member 216 to enter and seat in the cavity 236. Once fully seated, the member 216 and the receptacle 214 may be rotated approximately 90 degrees with respect to each other so that the second axis of the member 216 is aligned with the first direction of the locking cavity 236. As shown in FIG. 12, at least one locking shoulder 252 (two opposing locking shoulders are shown) is aligned with the first direction. Since the width $W_1$ at the top of the locking cavity 236 is less than the $W_4$ of the member 216 defined by the locking lugs 248, the lugs 248 engage the locking shoulders 252 thereby securing the member 216 in the receptacle 214.

As shown in FIGS. 9 and 10, the member 216 is secured to the base plate P of the accessory A by means of a fastener 254. More specifically, the accessory mounting shank 250 is inserted through an aperture E in the base plate P. A control handle 256 is then connected to the member 216. The control handle 256 is positioned so that the accessory mounting shank 250 extending up through the base plate P is received in an aperture 258 in the control handle 256. The aperture 258 is acircular and engages a cooperating acircular shoulder on the accessory mounting shank 250. The fastener 254 is then tightened down on the accessory mounting shank 250 so as to secure the control handle 256 to the member 216 and the member 216 to the base plate P of the accessory A.

When it is desired to attach an accessory A each member 216 is aligned by operation of its respective control handle 256 so that the second axis of the member 216 including the locking lugs 248 is aligned with the second direction of the associated receptacle 214. This provides the necessary clearance to allow each member 216 to drop into and be fully seated in the locking cavity 236 of the associated receptacle 214. Once each member 216 is fully seated, the control handle 256 is rotated through an arc of approximately 90 degrees. Simultaneously, the member 216 is rotated so that the locking lugs 248 are now aligned with the direction and, therefore, engage the locking shoulders 252 of the receptacles 214.

This engagement between the lugs 248 and the shoulders 252 serves to secure the members 216 in the receptacles 214 and, therefore, the accessory A in the bed B of the vehicle. The control handles 256 may be secured in the locking position. In particular, the ends 260 of the control handles 256 extend through an aperture or slot formed in the leg L of the accessory A. The ends 260 each include an aperture 262. A fastener, such as a pin, can be inserted through the aperture 262 and engages the leg L. Accordingly, the control handle 256 and the member 216 are secured in the locked position. To remove the accessory A, the opposite occurs. This is similar to that shown in FIG. 8.

In a third alternative embodiment shown in FIGS. 14–16, each receptacle 314 includes an upper wall 330, a sidewall 332, and a bottom wall 334. A keyhole-shaped slot 336 is provided in the upper wall 330. The keyhole-shaped slot 336 includes a first end 338 having a first width $W_1$ and a second end 340 having a second width $W_2$ where $W_1 > W_2$. The keyhole-shaped slot 336 is in communication with an internal cavity 342 defined by the upper wall 330, sidewall 332, and bottom wall 334.

Each receptacle 314 is mounted to one of the cross members 22, 24 by means of a fastener such as a bolt 344. More specifically, the bolt 344 extends through an aperture 346 in the bottom wall 334 of the receptacle 314 and an aperture 348 in the cross member 22, 24. A lock nut 350 may be secured to the bolt 344 in order to complete the connection.

Each member 316 comprises a neck or stem 352 having a first cross section $C_1$ and a head 354 having a second cross section $C_2$ wherein $C_2$ has a width greater than $C_1$. The end of the stem 352 opposite the head 354 is mounted to a base plate P of the vehicle accessory A. This mounting may be completed by means of fasteners such as screws, bolts, or the like or fastening processes such as welding, staking, or the like. A locking element in the form of a bolt 356 is also provided. The bolt 356 is received in a threaded aperture R of the mounting plate P adjacent the point of mounting of the member 316.

It should be appreciated that the width $W_1$ of the first end 338 of the keyhole-shaped slot 336 is greater than the width of the cross section $C_2$ of the head 354 of the member 316. Further, the width of the cross section $C_2$ of the head is greater than the width $W_2$ of the second end 340 of the keyhole-shaped slot 336. In addition, the width $W_2$ is greater than the width of the cross section $C_1$ of the stem 352 of the member 316. Advantageously, these dimensional differences allow the member 316 to be received and secured in the keyhole-shaped slot 336 of the receptacle 314 by means of the locking element or bolt 356.

More specifically, the alignment of a member 316 on a support plate P of an accessory A with the receptacle 314 in order to allow mounting of the accessory A. The locking element 356 is retracted so as not to extend below the bottom wall of the support plate P. The member 316 is aligned so that the head 354 may be inserted into the cavity 342 through the first, wide end 338 of the keyhole-shaped slot 336. Once so inserted, the member 316 is shifted until the stem 352 of the member is received in the second, narrow end 340 of the keyhole-shaped slot 336. In this position, the upper wall 358 of the substantially T-shaped member 316 engages the lower surface of the upper wall 330 of the receptacle 314 thereby preventing the member 316 from being lifted from the receptacle 314.

The stem 352 of the member 316 is locked in the second end 340 of the keyhole-shaped slot 336 by means of the bolt 356. More specifically, the bolt 356 is tightened in the aperture R until it extends downwardly from the support plate P into the first end 338 of the keyhole-shaped slot 336. The engagement of the locking element or bolt 356 with the inner surface of the sidewall 332 defining the cavity 342 prevents the member 316 from being shifted thereby retaining the member 316 captured or locked in the receptacle 314. To remove the member 316, the opposite is performed. The accessory A is then attached as previously described and as shown in FIG. 8.

Figure 18:
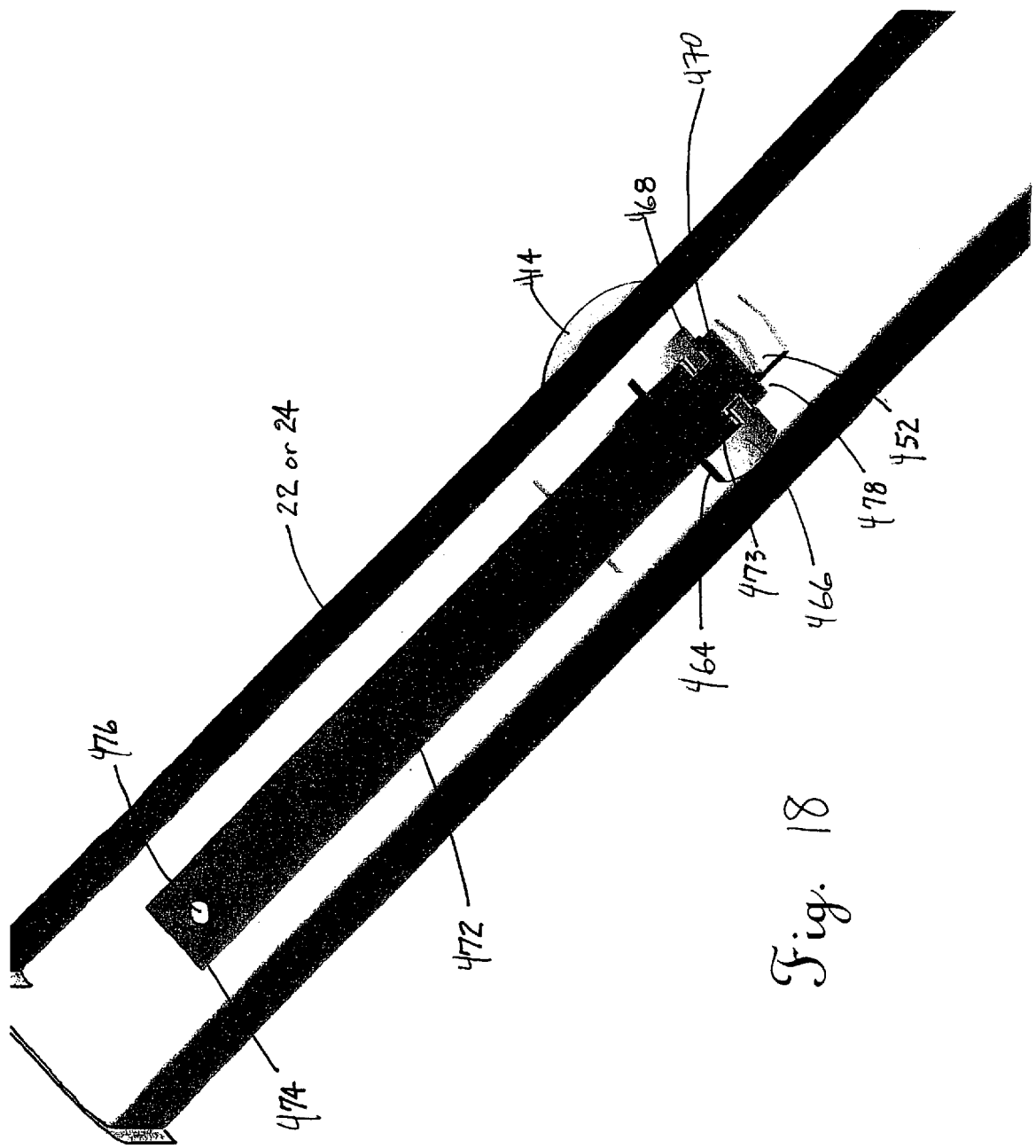
FIG. 18 is a detailed bottom perspective view of the alternate embodiment showing a single member locked in the storage position.

In a fourth and final embodiment of the present invention shown in FIGS. 17–19, each receptacle 414 includes an upper wall 440, a sidewall 442 and a bottom wall 444. A bore 448 extends through the walls 440 and 444. The bore 448 has a cross section of a first shape such as circular. Each receptacle 414 is mounted and fixed by welding, staking or other means to one of the cross members 22, 24 directly above a socket 452 provided in the top wall of that cross member 22, 24. The socket 452 has a cross section of a second shape different from the first shape, e.g., acircular.

Each accessory mounting member 416 includes a body 460 having a first, cylindrical portion 462 and a second substantially acircular shaped portion 464. As should be appreciated, the first portion 462 is sized and shaped to be slidingly received in the bore 448 of the receptacle 414. The second, acircular portion 464 is sized and shaped to be slidingly received in the similarly shaped socket 452. As shown in FIG. 18, the member 416 also includes an end 466 having a substantially H-shaped recess 468 that is sized and shaped to receive the second end 470 of a biasing element in the form of a spring bar 472 (note the opposed notches 473 adjacent the second end of the spring bar so that end corresponds in shape to the recess 468). The spring bar 472 has a first end 474 that is riveted or otherwise fastened to one of the cross members 22, 24 (note rivet 476). The spring bar 472 may, for example, be made from spring steel.

As should be appreciated, the mounting member 416 is selectively displaceable between a storage position and an accessory receiving position. In the storage position, the member 416 is retracted into the receptacle 414 so that the top of the member 416 is substantially level with or just above the top of the upper wall 440 of the receptacle 414. In this retracted position the member 416 is protected from damage by the receptacle 414. Further, it should be appreciated that the retracted member 416 provides little if any interference with the use of the bed B of the vehicle.

As shown in FIG. 18, the member 416 is locked in the storage position against the biasing force of the spring bar 472. Specifically, a tool is utilized to depress the member 416 down into the receptacle 414. Once the second portion 464 of the member 416 clears the socket 452 in the upper wall of the cross member 22 or 24, the member 416 is turned or rotated 90 degrees. As a result, the second portion 464 laps the socket 452 and engages the cross member 22 or 24 at the margins 478 thereof. This engagement serves to lock the member 416 in the storage position. The member 416 is positively locked against further rotation in the storage position by engagement of the second end 470 of the spring bar 472 in the H-shaped recess 468 on the end 466 of the member 416.

When it is desired to attach an accessory A, each member 416 is displaced into the accessory receiving position. In order to do this, a tool is utilized to rotate the member 416 through a 90-degree arc until the second portion 464 is aligned to pass through the socket 452. Once properly aligned the biasing force of the spring bar 472 pushes the member 416 upward in the direction of action arrow P so that the member 416 projects through the upper wall 440 of the receptacle 414. As should be appreciated, the second portion 464 of the member 416 engages the bottom wall 444 of the receptacle 414 when fully raised. When fully raised, an aperture 480 in the first portion 462 of the member 416 is fully exposed. The accessory A is then attached as previously described and as shown in FIG. 8.

The foregoing description of embodiments of the invention have been presented for purposes of illustration and description. It is not intended to be exhaustive or to limit the invention to the precise forms disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims and their fair and broad interpretation in any way.

Having thus described the invention, we claim:

1. A vehicle accessory mounting system, comprising:
    a frame assembly having an opening and a locking cavity, said locking cavity being in communication with said opening; and
    at least two accessory mounting members capable of being removably mounted within said opening to removably mount an accessory to a vehicle, said accessory mounting members comprising:
        a body;
        a locking element aperture within said body; and
        a locking element held within said aperture, said locking element being moveable between a retracted, unlocked position wherein said locking element does not engage said locking cavity and an extended, locked position wherein said locking element engages said locking cavity to prevent removal of said mounting member from within said opening.

2. The vehicle accessory mounting system of claim 1, wherein said frame assembly comprises at least one frame member and at least one receptacle carried by said frame member, wherein said receptacle provides said opening and said locking cavity.

3. The vehicle accessory mounting system of claim 2, wherein said locking cavity is a detent located along said receptacle opening.

4. The vehicle accessory mounting system of claim 2, wherein said locking cavity is a continuous race.

5. The vehicle accessory mounting system of claim 4, wherein said locking element is a ball bearing.

6. The vehicle accessory mounting system of claim 5, wherein a rotary actuator is located within said accessory mounting member body so that, upon rotation of the actuator in one direction, the ball bearing is forced into the locked position and, with rotation of the actuator in the other direction, the ball bearing is released from the locked position.

7. The vehicle accessory mounting system of claim 6, wherein a handle is connected to said rotary actuator.

8. A vehicle accessory mounting system for use with a vehicle having a horizontal mounting surface, said vehicle accessory mounting system comprising:
    a frame member mounted to the frame of a vehicle, wherein said frame member is mounted underneath said horizontal mounting surface;
    a receptacle carried by said frame member, said receptacle having an opening and a locking cavity, said locking cavity being in communication with said opening, said receptacle opening accessible through an aperture in said horizontal mounting surface;
    an accessory mounting member capable of being removably mounted within said opening so as to removably mount an accessory to said horizontal mounting surface, said accessory mounting member comprising:
        a body having a sidewall;
        an aperture extending through said sidewall; and
        a locking element held within said sidewall aperture, said locking element being moveable between a retracted, unlocked position wherein said locking element does not engage said locking cavity and an extended, locked position wherein said locking element engages said locking cavity to prevent removal of said mounting member from within said opening.

9. The vehicle accessory mounting system of claim 8, wherein said accessory mounting member body further includes a first end, a second end, and a bore extending through said body from said first end to said second end with said bore in communication with said sidewall aperture.

10. The vehicle accessory mounting system of claim 9, wherein a rotary actuator is held within said bore of said accessory mounting body for urging said locking element between said locked position and said unlocked position.

11. The vehicle accessory mounting system of claim 10, wherein said rotary actuator comprises a stem end projecting from said second end of said body and a head end at least partially located within said first end of said body wherein said head end includes a channel.

12. The vehicle accessory mounting system of claim 11, wherein said channel includes a first portion having a depth E1 and a second portion having a depth E2 where E1>E2.

13. The vehicle accessory mounting system of claim 12, wherein when said rotary actuator is rotated between a first direction where said channel having depth E2 engages said locking element to force said locking element into said locked position and a second direction wherein said channel having depth E1 permits said locking element to withdraw into a retracted, unlocked position.

14. The vehicle accessory mounting system of claim 13, further comprising an operator handle attached to said actuator stem to permit an operator to rotate said actuator between said first and second directions.

15. The vehicle accessory mounting system of claim 14, wherein said receptacle includes a bottom wall having a mounting aperture therein and further comprising an anchor passing through said mounting aperture and engaging said frame member to mount said receptacle to said frame member.

16. A vehicle accessory mounting system, comprising:
a frame assembly having an opening and a locking cavity, said locking cavity being in communication with said opening; and
a plurality accessory mounting members capable of being removably mounted within said opening to removably mount a fifth wheel hitch to a vehicle, said accessory mounting members comprising:
a body;
a locking element aperture within said body; and
a locking element held within said aperture, said locking element being moveable between a retracted, unlocked position wherein said locking element does not engage said locking cavity and an extended, locked position wherein said locking element engages said locking cavity to prevent removal of said mounting member from within said opening.

17. The vehicle accessory mounting system of claim 16, wherein said locking element includes at least one ball bearing.

18. The vehicle accessory mounting system of claim 16, wherein said accessory mounting members further include a rotary actuator engageable with said locking element.

19. The vehicle accessory mounting system of claim 18, wherein said accessory mounting members further include an operator handle secured to said rotary actuator.

20. The vehicle accessory mounting system of claim 19, wherein manipulation of said operator handle in a predetermined direction and distance rotates said rotary actuator displacing said locking element between an unlocked position and a locked position.

* * * * *